No. 744,782. PATENTED NOV. 24, 1903.
S. E. MORSE.
STERILIZER.
APPLICATION FILED FEB. 24, 1903.
NO MODEL.

Witnesses:
J. Staib
Chas. H. Smith

Inventor:
Sidney E. Morse
per Harold Serrell
atty.

No. 744,782.                                      Patented November 24, 1903.

UNITED STATES PATENT OFFICE.

SIDNEY E. MORSE, OF NEW YORK, N. Y., ASSIGNOR, BY DIRECT AND MESNE ASSIGNMENTS, TO HIMSELF AND ANNA C. MORSE, OF NEW YORK, N. Y.

STERILIZER.

SPECIFICATION forming part of Letters Patent No. 744,782, dated November 24, 1903.

Application filed February 24, 1903. Serial No. 144,660. (No model.)

*To all whom it may concern:*

Be it known that I, SIDNEY E. MORSE, a citizen of the United States, residing at the borough of Manhattan, in the city, county, and State of New York, have invented an Improvement in Sterilizers, of which the following is a specification.

My invention is designed as an improvement upon the device described and shown in the Letters Patent granted to Robert H. Speare, dated April 7, 1903, No. 724,964. The device of the said patent was adapted to receive and hold implements, instruments, and tools of various kinds—such as are employed by surgeons, dentists, barbers, and others in a professional or business capacity—for the purpose of sterilizing the same after use and preparatory to further use with the object of destroying bacteria, bacilli, or other germs or microbes to prevent the dissemination thereof.

The object of my present invention is to overcome difficulties that have been found to exist in devices heretofore employed and to make the same in a more perfect and convenient manner and more fully adapted for carrying out the purposes intended.

In the device of my invention I provide suitable means for the entrance of air into the apparatus adjacent to the lamp for heating the disinfecting or sterilizing liquid and form a part of the case as a flue or chimney for conveying away the heated products of combustion, and below the drawer holding the disinfecting or sterilizing liquid to be heated. The case is closed off, so that the lower portion becomes a combustion-chamber and the upper portion a vapor-chamber only. I further provide in the case means for collecting the water of condensation and returning the same to the receptacle holding the disinfecting or sterilizing liquid. Means are also provided for directing the vapor, and removable parts are provided as supports for the reception of combs, scissors, brushes, and shaving-mugs or shaving-brushes, which parts can be removed to be thoroughly washed.

The details of the apparatus are hereinafter more particularly described.

Figure 1:
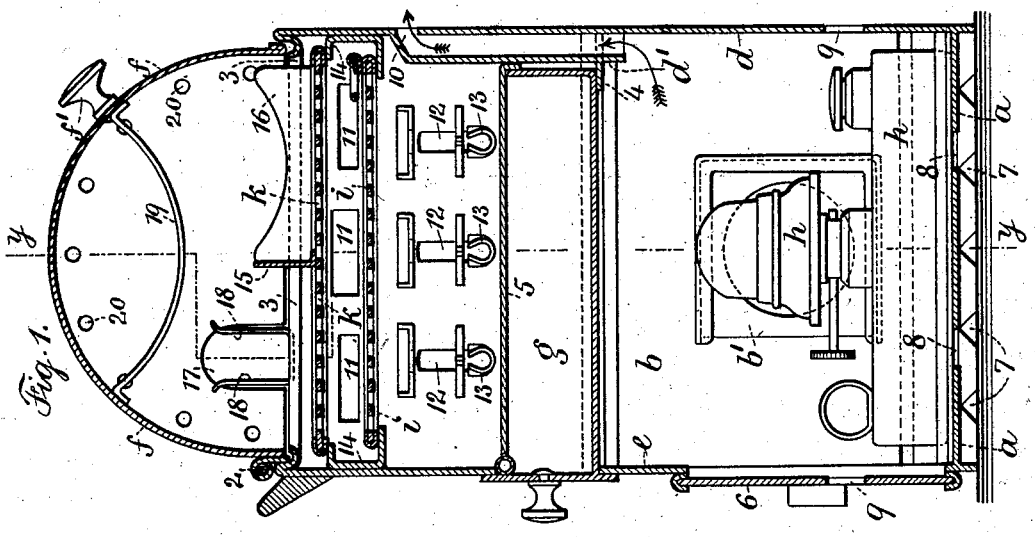
Figure 2:
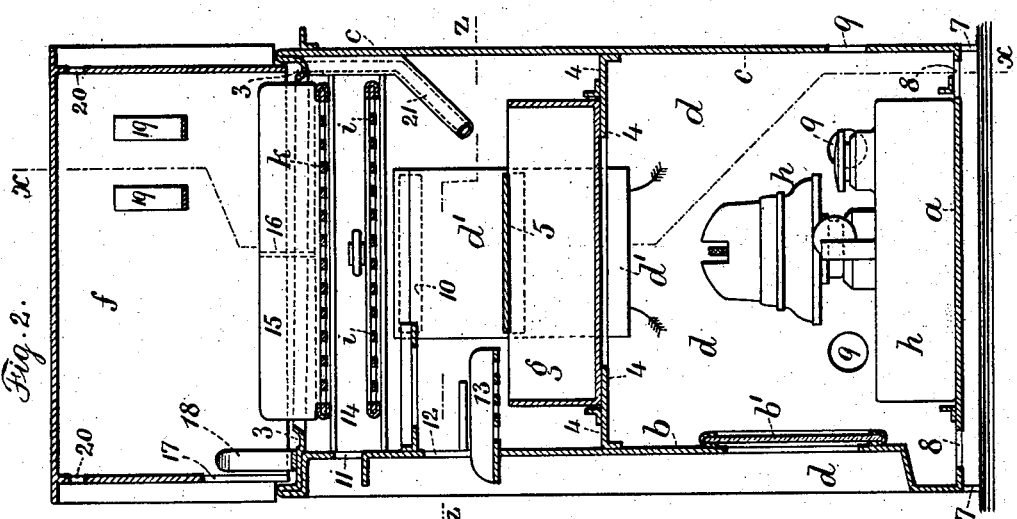
Figures 3, 4:
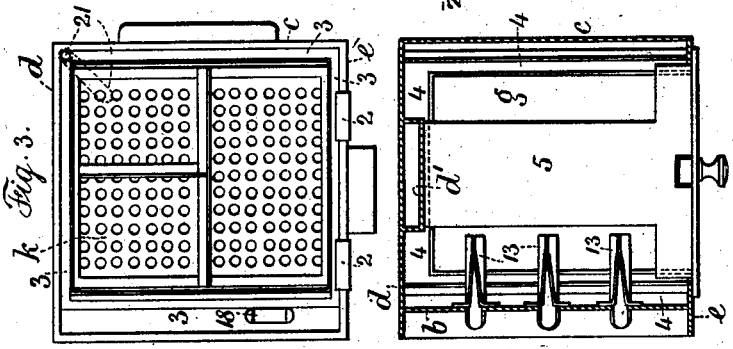

In the drawings, Figure 1 is a vertical section on the line $x\ x$ of Fig. 2, and Fig. 2 is a vertical section substantially at right angles to Fig. 1 and on the line $y\ y$ of said figure. Fig. 3 is a plan with the cover removed, and Fig. 4 a sectional plan at $z\ z$ of Fig. 2. Figs. 3 and 4 are of smaller size.

The case of the sterilizer is preferably made of sheet metal, and it may be ornamented or plated and finished in any desired manner. The same comprises the bottom $a$, slightly elevated to provide an air-space beneath the same, and sides $b$, $c$, $d$, and $e$. A cover $f$ is also provided and hinged at 2 to the case, and a button $f'$ may be grasped by the hand to raise and lower the cover. The side $b$ is recessed within the vertical edges of the sides $d\ e$ to receive the ends or handles of implements that may be placed in the case to be sterilized, such as the handles of razors or scissors, the recess being just about deep enough to prevent the same being struck by passing objects. In the side $b$ there is a plate of mica $b'$, so as to visually disclose through the case the condition of the flame of the lamp. The sides and the bottom plate form a substantially integral structure, around the upper end of which is a ledge 3, the edge of the same carrying or being provided with a gutter. This ledge or the gutter, or both, is preferably made to taper slightly from one corner of the case, and the edge is higher than the ledge, so that the cover fits down within the ledge. Consequently any moisture or water of condensation collecting on the inner surface of the convex cover will descend by gravity to the ledge and run off into the gutter and by the gutter from opposite sides be delivered into a leader 21, formed in the corner of the case diagonally opposite to the highest corner, so that the water of condensation thus delivered may be discharged into the drawer or receptacle $g$ for receiving and holding disinfecting or sterilizing liquid. The case is made with ledges 4 around three sides—that is, around the sides $b$, $d$, and $c$—so as to support said drawer or receptacle, the same being, however, removable from the case through an opening in the side $e$. The fact that the drawer rests upon these ledges and overlaps the aperture in the case $e$ provides a substantially tight joint, which divides the case as a partition into lower and upper portions, the lower portion being a combustion-chamber and receiving the lamp $h$, holding burning fluid, and the upper part being entirely a vapor-chamber and provided with devices for receiving the tools or implements to be sterilized. This drawer or receptacle $g$ is preferably provided with a central plate or deflector 5, performing the function of directing the movement of the vapor rising from the heated liquid in the said drawer or receptacle. I have shown this plate or deflector as running lengthwise of the drawer or receptacle. The lamp $h$ for burning fluid is advantageously inserted into the base of the case through a slide-plate 6 in the side $e$, which plate in the operation of the device is normally closed. Air-openings 7 in the base of the sides $b$ and $c$, air-openings 8 in the bottom $a$ of the case, and air-openings 9 in the sides $d$ and $e$ are provided, so as to supply an abundance of air to the lamp. Instead of employing a chimney, which would be liable to break and would occupy available space that could be put to a better purpose, I provide in the side $d$ an elongated opening 10 and a frame $d'$, secured to the side $d$, having a part closing over the opening 10 and open at the lower end, which frame forms a flue, the open lower end being in the combustion-chamber of the lamp. This flue provides a passage for the air and products of combustion, so as to maintain a flame without smoke, which flame approximately impinges upon the under surface of the drawer or receptacle $g$ for heating and vaporizing the liquid contained therein.

In the side $b$ of the case I provide openings 11 for combs or scissors elongated in a horizontal direction and below the same other openings 12 elongated vertically, the openings 12 being for the blades of razors, and formed in these openings 12 and connected to the side $b$ are slideway-guides 13 for the razors, the blades thereof being set vertically and resting upon the backs of the blades with the cutting edges uppermost.

Within the case and adjacent to the upper edge and advantageously attached to the inner surface of the sides $d$ $e$ I provide ledge-brackets 14, on the lower portions of which a perforated partition-tray $i$ is received, the same coming just below the openings 11. On the upper part of the ledge-bracket 14 is received a perforated partition-tray $k$, adapted to receive a hair-brush between the vertical rising division-plate 15 and the side of the case, and on the other side of said division-plate 15 there is another division-plate 16 at right angles thereto dividing the other side into two parts adapted to receive upon the tray $k$ two shaving-mugs with the brushes therein or the brushes alone. The cover $f$ is provided in one end with an edge notch 17 to receive the handle of the brush, and secured to the upper edge of the case, at the opposite edges of said notch, there are spring-clips 18 to engage the handle and hold the brush independent of the movement of the cover. In the cover are shown strap-plates 19, which are adapted to hold a sponge, if desired, which sponge as an absorbing agent collects the moisture; but I do not limit myself to the use of this device. I preferably provide openings 20 in the cover for the discharge of surplus vapor.

In the operation of the device and as hereinbefore mainly stated the air for combustion of the lamp-flame enters at the openings 7, 8, and 9, and the products of combustion pass away by the flue formed by the frame $d'$ and pass out of the case at the opening 10. The vapor from the liquid in the drawer or receptacle $g$ passes up at either side between the edges of the drawer and the edges of the central plate 5 and passes around the blades of razors, around the parts of scissors and combs, and around and between the bristles of a brush that may be in the case, so as to thoroughly disinfect and sterilize the same.

I do not limit myself to the proportions of these parts nor to the implements or receptacles for holding the same that may be provided in the case.

Where the sterilizer is employed for barber's use, it is advantageous that each barber should have near him an apparatus for his individual use.

I claim as my invention—

1. A sterilizer for implements, instruments and tools of various kinds, comprising a case having substantially continuous sides, a hinged cover, a removable drawer and coacting means for dividing the case into a combustion-chamber at the lower part and a vapor-chamber above, a device for heating and a receptacle for holding disinfecting or sterilizing liquid, and a flue extending partly through the vapor-chamber and formed along one side of the case and between the same and a wall parallel thereto, and opening at the lower end into the upper part of the combustion-chamber and at the upper end through the case for carrying the products of combustion away.

2. A sterilizer for implements, instruments and tools of various kinds, comprising a case, a cover, means for dividing the case into a combustion-chamber at the lower part and a vapor-chamber above, a device for heating and a receptacle for holding disinfecting or sterilizing liquid, and a flue formed along one side of the case and opening at the lower end into the combustion-chamber for carrying away the products of combustion, and means located in the upper part of the case for collecting the condensed vapor and returning the same to the receptacle holding the disinfecting liquid.

3. In a sterilizer for implements, instruments and tools of various kinds, the combination with a case, of a ledge surrounding the case at the upper end and highest at one corner, a series of gutters formed with the ledge and gradually descending to an opposite corner, and a leader for discharging the condensed vapor so collected, and a cover hinged to the case and at its lower edges adapted to fit within the case and upon the ledges, substantially as set forth.

4. In a sterilizer for implements, instruments and tools of various kinds, the combination with the sides, of ledges 4 around three sides of the case, a drawer or receptacle having a closed bottom for disinfecting liquid entering the case through an aperture in the fourth side of the case, and resting upon said ledges so as to close off the case horizontally into lower and upper chambers.

5. In a sterilizer for implements, instruments and tools of various kinds, the combination with the sides, of ledges 4 around three sides of the case, a drawer or receptacle for disinfecting liquid entering the case through an aperture in the fourth side of the case and resting upon said ledges so as to close off the case horizontally into lower and upper chambers, a lamp for burning fluid in the lower chamber and a flue communicating with said chamber and opening through one side above the same for conveying away the heated products of combustion, and devices connected to the case and providing for the entrance of implements into the case and in the upper chamber to be sterilized.

6. In a sterilizer for implements, instruments and tools of various kinds, the combination with the two sides $d$, $e$, of two-part ledge-brackets near the upper end of the case and extending along said opposite sides, perforated partition-trays adapted to be supported respectively upon the upper and lower portions thereof and to support implements to be disinfected, said partition-trays being removable from the case.

7. In a sterilizer for implements, instruments and tools of various kinds, the combination with the sides, of ledges 4 around three sides of the case, a receptacle for disinfecting liquid entering the case through an aperture in the fourth side of the case and resting upon said ledges so as to close off the case horizontally into lower and upper chambers, and a central plate or deflector 5 narrower than the width of the drawer or receptacle and extending over the center of the same so as to form discharge-apertures for the vapor leaving the said receptacle.

Signed by me this 19th day of February, 1903.

SIDNEY E. MORSE.

Witnesses:
 GEO. T. PINCKNEY,
 S. T. HAVILAND.